(12) United States Patent
Mortensen

(10) Patent No.: US 7,584,414 B2
(45) Date of Patent: Sep. 1, 2009

(54) EXPORT TO EXCEL

(75) Inventor: Joern Lindhard Mortensen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 11/047,919

(22) Filed: Feb. 1, 2005

(65) Prior Publication Data

US 2006/0174192 A1 Aug. 3, 2006

(51) Int. Cl.
*G06F 17/00* (2006.01)
(52) U.S. Cl. .................. 715/212; 715/234; 715/249
(58) Field of Classification Search ................ 715/503, 715/513, 523, 212, 234, 249
See application file for complete search history.

(56) References Cited

U.S. PATENT DOCUMENTS 6,613,098 B1 * 9/2003 Sorge et al. ............... 715/503

OTHER PUBLICATIONS

Balter, Allison, "Alison Balter's Mastering Microsoft® Office Access 2003", Dec. 8, 2003, Sams.*
Yandell, Henri, "Generating XML via Java", Mar. 18, 2002, TechRepublic, http://articles.techrepublic.com.com/5100-22-1044810.html.*
"Table Tutorial", HTMUnit, Sourceforge.net, Archived Oct. 16, 2002 http://htmlunit.sourceforge.net/table-howto.html.*
"Extensible Markup Language (XML) 1.0 (Second Edition)," W3C Recommendation Oct. 6, 2000, http://www.w3.org/TR/2000/REC-xml-20001006, 51 pages.
"XML Schema Part 1: Structures Second Edition," W3C Recommendation Oct. 28, 2004, http://www.w3.org/TR/xmlschema-1/, 183 pages.
Stowe, Michael, "XML in Excel and the Spreadsheet Component," Microsoft Corporation, Aug. 2001, http://msdn.microsoft.com/library/en-us/dnexcl2k2/html/odc_xlsmlinss.asp?frame=true, 5 pages.
Stowe, Michael, "XML Spreadsheet Reference," Microsoft Corporation, Aug. 2001, http://msdn.microsoft.com/library/en-us/dnexcl2k2/html/odc_xmlss.asp?frame=true, 27 pages.
"Global XML Web Services Architecture," White Paper, Microsoft Corporation, Oct. 2001, http://www.gotdotnet.com/team/XMLwebservices/gxa_overview.aspx, 8 pages.

* cited by examiner

*Primary Examiner*—Adam M Queler
(74) *Attorney, Agent, or Firm*—Marshall, Gerstein & Borun LLP

(57) ABSTRACT

The method may include generating a plurality of reports where the plurality of reports comprise data from a database, generating at least one report document from the plurality of reports, the at least one report document comprising a plurality of rows, the at least one report document further comprising at least one report document object. The method may also include providing a row pointer to at least one row of the at least one report document, converting the at least one report document object of the at least one row to an extensible markup language schema definition object, serializing the extensible markup language schema definition object to an extensible markup language document. Additionally, if the at least one report document comprises additional rows, the method may include moving the row pointer to the additional row of the at least one report document and repeating serializing the extensible markup language schema definition object of the at least one row to an extensible markup language document.

8 Claims, 5 Drawing Sheets

EXPORT TO EXCEL

BACKGROUND

Exporting reports generated by an application to one or more alternate formats has long been a goal of business. Computers generally aid such a process of exporting the report by allocating memory involved in the process of converting the report from one format type to another format type. As a result, computers may have a significant burden to allocate large amounts of memory when exporting reports.

The need to allocate large amounts of memory when exporting reports is particularly troublesome to small businesses. Such businesses may not operate high-performance computers with large amounts of memory, or a network of servers working to convert reports to alternate document formats, such as a format that may be viewed with Microsoft Excel. Additionally, exporting data/reports to alternate document formats generally takes considerable time as intermediary objects are generally created to hold the data before it is eventually converted to an alternate format and written as a document file.

Therefore, there is a need to develop a method to export data/reports to an alternate document format which reduces memory requirements of computers and reduces the time taken during the conversion process.

SUMMARY

A method and apparatus for creating an extensible markup language document is disclosed. The method may include generating a plurality of reports where the plurality of reports include data from a database, generating at least one report document from the plurality of reports, the at least one report document including a plurality of rows, the at least one report document further including at least one report document object. The method may further include providing a row pointer to at least one row of the at least one report document, converting the at least one report document object of the at least one row to an extensible markup language schema definition object, and serializing the extensible markup language schema definition object to an extensible markup language document. Additionally, if the at least one report document includes additional rows, the method may include moving the row pointer to the additional row of the at least one report document and repeating serializing the extensible markup language schema definition object of the at least one row to an extensible markup language document.

The method of converting the at least one report document object of the at least one row may further include a report document object type of at least one of values, names, and styles, and calculating if the row is at least one of type header, data, and group. Furthermore, the method may further include converting the header row to an extensible markup schema definition row, converting the data row to an extensible markup schema definition row, and converting the group row to an extensible markup schema definition row. The method may further include creating the extensible markup language document for Microsoft Excel. A computer readable medium with computer executable instructions to execute the method is disclosed as is a computer system with a processor programmed to execute the method.

DRAWINGS

FIG. 2a is an illustration of a report in accordance with the claims;

FIG. 2b is an illustration of a Microsoft Excel spreadsheet in accordance with the claims;

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
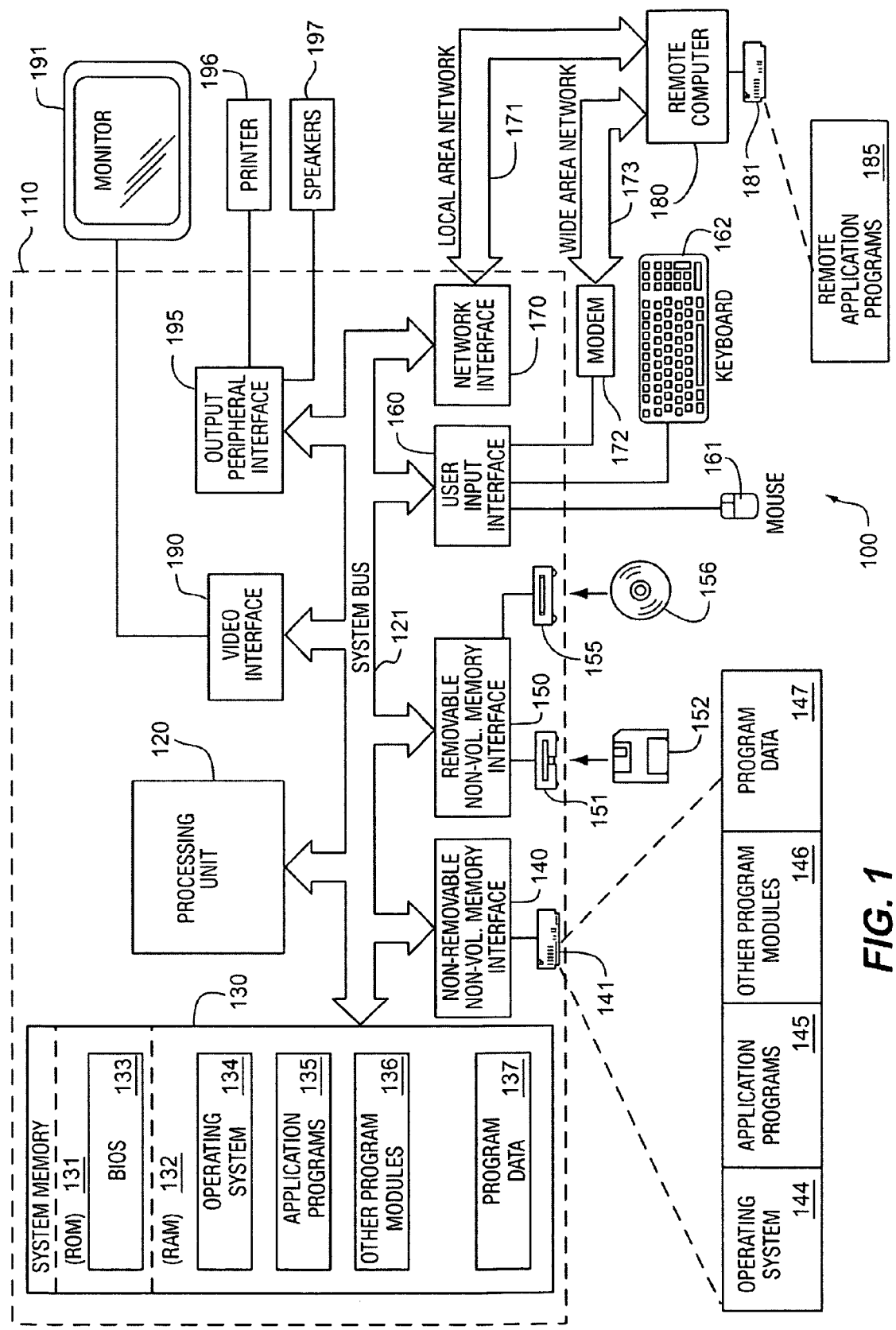
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figures 2A, 2B:
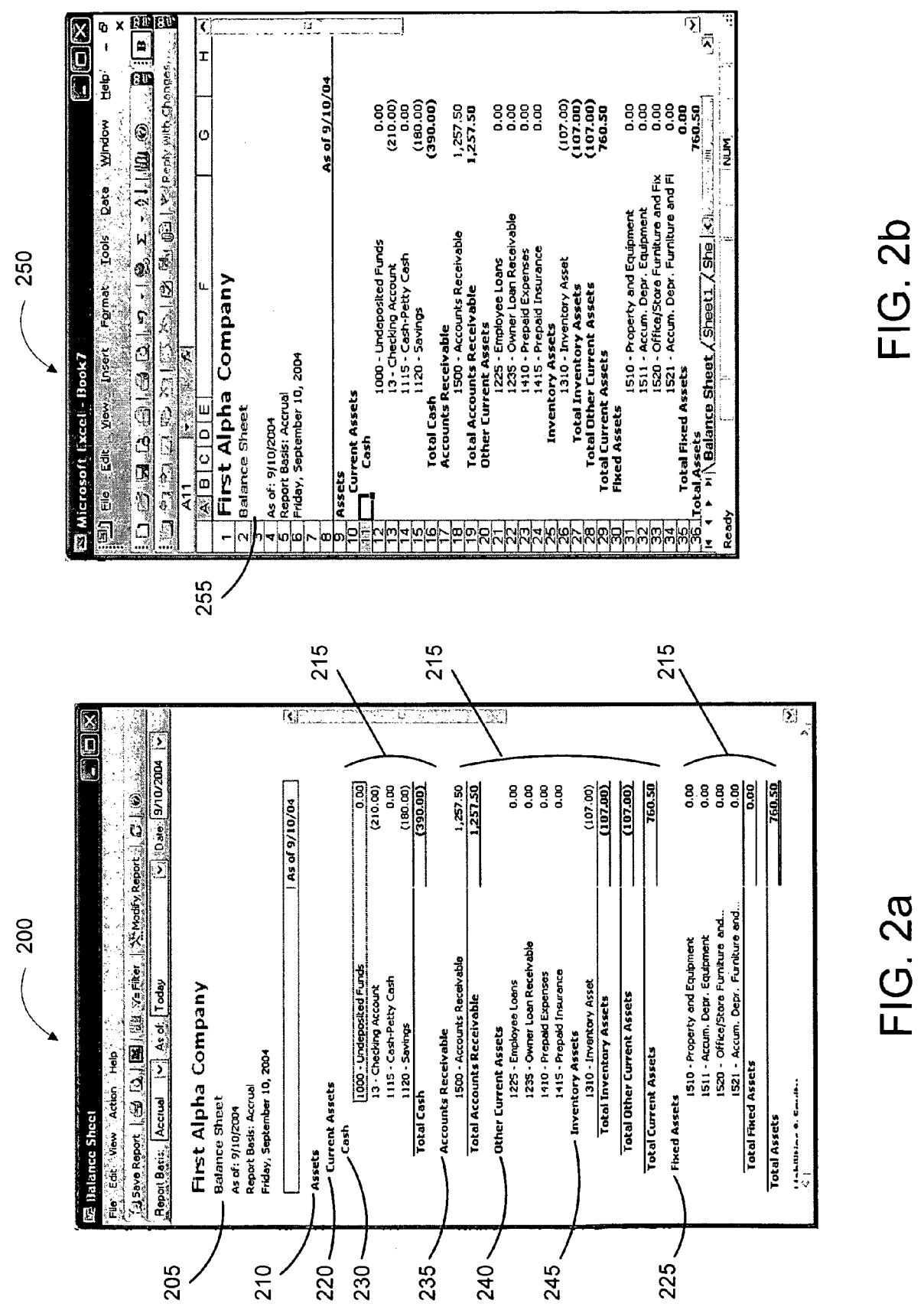

FIG. 2a may be an illustration of a report 200 in accordance with the claims. A Balance Sheet 200 may be an example of a report that was generated from information in a database. An application, or computer executable software program, displaying the report may be part of a business application, such as the Microsoft Small Business Accounting financial management package, or custom designed application. The report may contain header information 205, group information 210, data information 215, and footer information (not shown), to name a few. Each type of information in the report 200 may also include various styles, such as font sizes, font colors, italics, strikethrough, and underlining. Group information 210 may additionally contain various levels of sub-groups, each of which may contain data information 215. For example, the group "Assets" 210 may contain sub-groups named "Current Assets" 220 and "Fixed Assets" 225. Furthermore, the Current Assets group may contain sub-groups named "Cash" 230 including sub-groups therein named "Accounts Receivable" 235, "Other Current Assets" 240, and "Inventory Assets" 245.

FIG. 2b may be an illustration of a document 250 created from the report 200. The document 250 is a Microsoft Excel document containing the same header information 255, and various forms of identical group and data information. Additionally, various styles present in the report 200 are also correctly represented in the Excel document.

Figure 3:
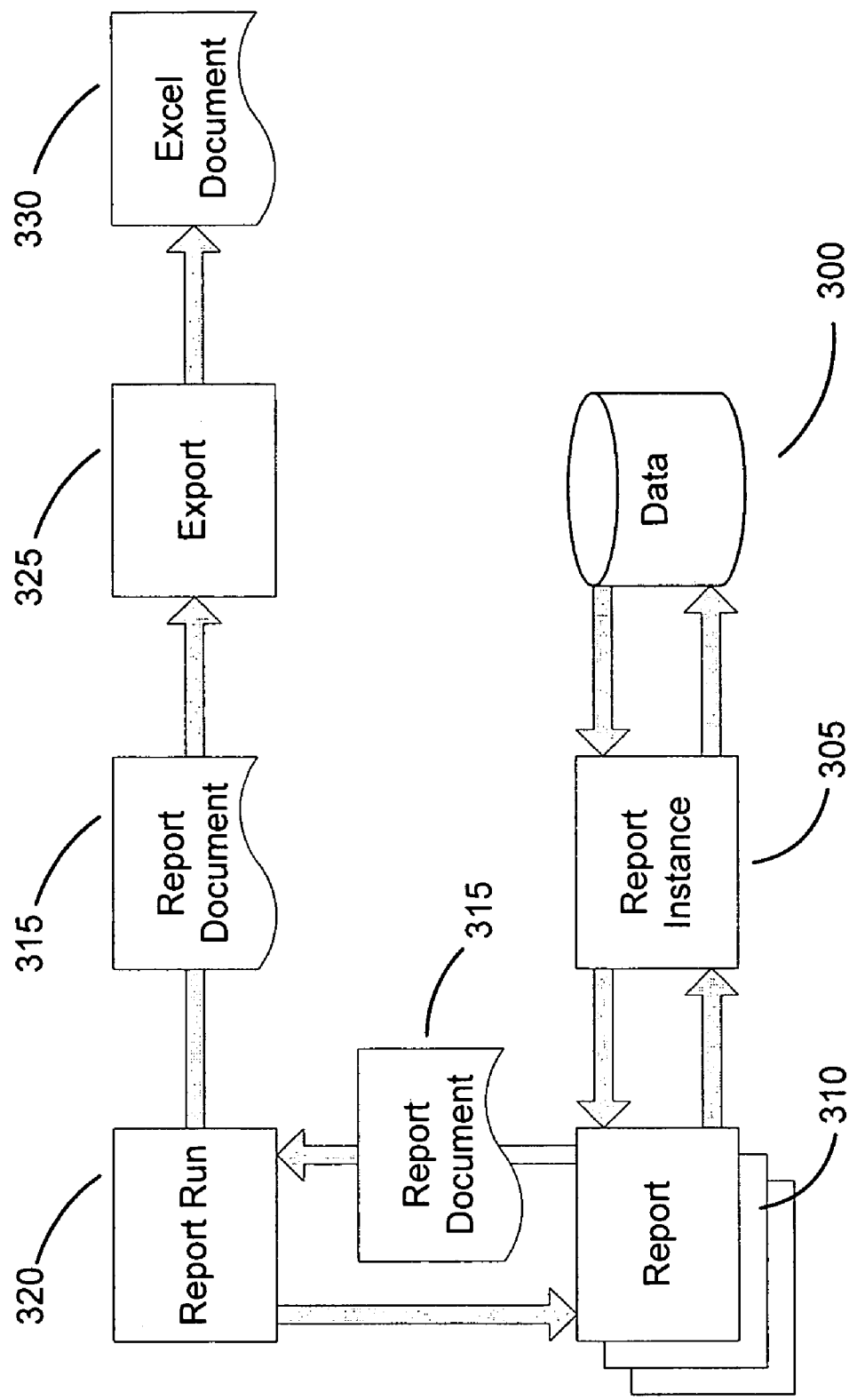
FIG. 3 is a flowchart of a method in accordance with the claims.

FIG. 3 may be an illustration of a method in accordance with the claims. At block 300 a database may provide data at the request of a report instance 305. The report instance 305 may be administered by any type of database management system, such as Microsoft SQL Server. The report instance 305 may obtain specific information from the database 300 and pass this information to a report process 310. The report process 310 configures the information returned from the database into a format that the application can display to a user in the form of a report document 315. In the event that additional or alternate report documents are desired, a report run process 320 may request the report process 310 generate the alternate report document 315. If necessary, the report process 310 may request that the report instance 305 perform a specific query on the database in an effort to generate the alternate report document.

Alternatively, at block 320, the report run process may initiate a request to convert the report document 315 into an alternate document format. In such a case, the report run process 320 passes the report document 315 to an Export process 325. As will be discussed later, the Export process 325 converts the report document 315, row-by-row, to an extensible markup language schema definition ("XSD") object before passing the object to an extensible markup language ("XML") file. The XML file may be configured to the particular requirements of Microsoft Excel so that it may be viewed as an Excel Document 330. Although the method of FIG. 3 illustrates creating an Excel document 330, the method is not limited to Excel, but may include any alternate document display application with a format capable of processing XML data, which includes virtually every modern word processor, spreadsheet, etc.

Figure 4:
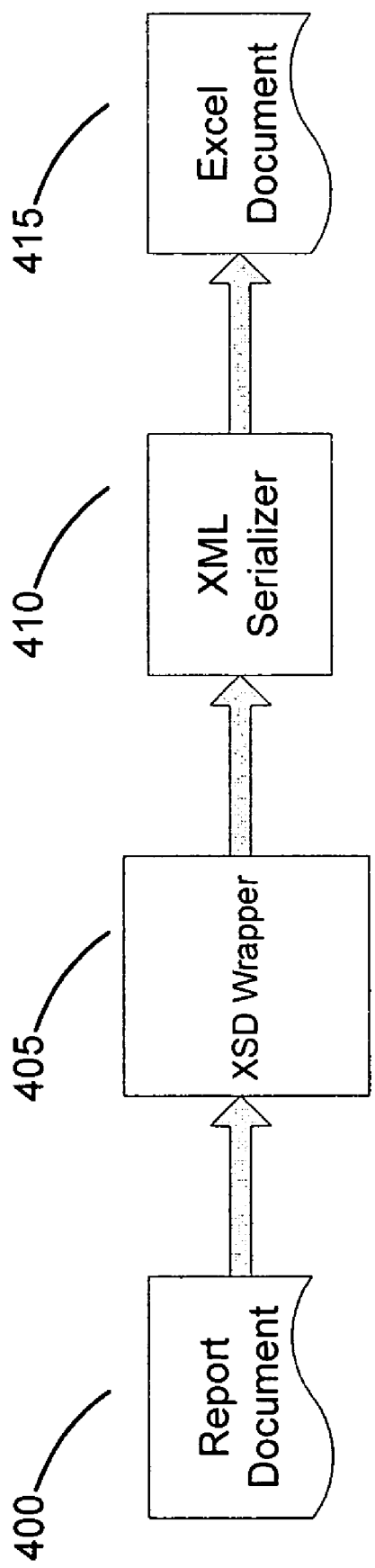
FIG. 4 is a flowchart of an export method in accordance with the claims.

FIG. 4 may be an illustration of the Export process in further detail, in accordance with the claims. Each report document 400 may have rows, with each row containing one or more objects. For example, a report document object of type ReportStyles may contain information pertaining to the overall appearance of the report document 400. Although modern spreadsheets such as Microsoft Excel are applications rich with style formatting and appearance options, they do not interpret the purpose and meaning of this particular object. Similarly, if the report document contains an object of type ReportDesignColumns, the spreadsheet does not have this same object and, therefore, cannot process or interpret meaningful functionality from it. An XSD Wrapper process 405 establishes a pointer to a row in the report document and converts the corresponding object in that row to an XSD object. Rather than iterate through the report document row-by-row while building an XSD file, the XSD object is immediately passed to an XML Serializer 410, such as the XML Serializer engine in the .NET Framework, which further converts the XSD object to an XML row and writes it to file. If there are additional rows within the report document 400, the pointer increments to the next row and the process repeats. The resulting XML file 415 may be of an appropriate schema to allow, for example, the spreadsheet to interpret. Serializing rows immediately (on-the-fly) eliminates a need to allocate memory resources that store an XSD file as the report document rows, and their corresponding objects, are being converted.

Figure 5:
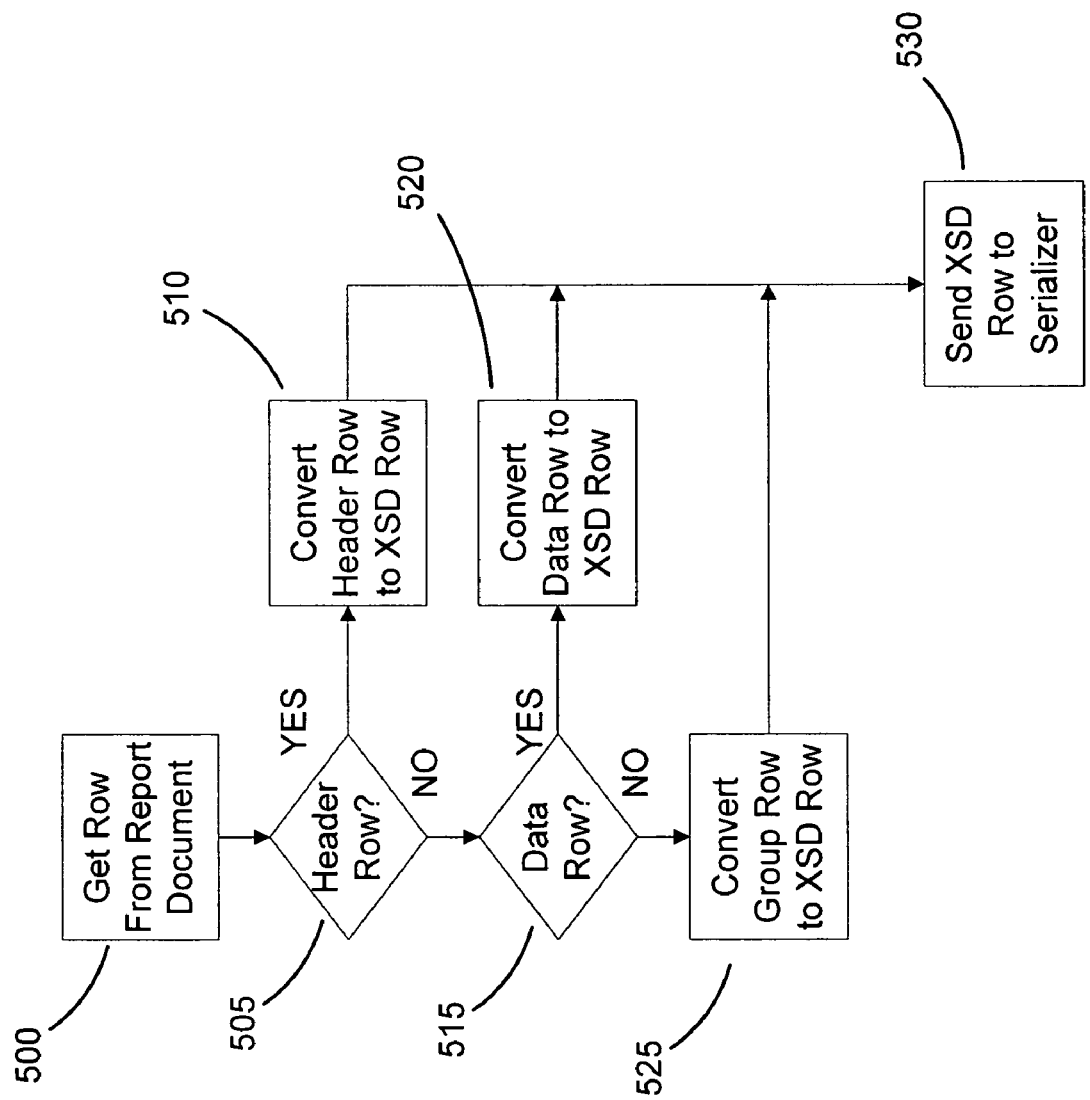
FIG. 5 is a flowchart of a wrapper method in accordance with the claims.

FIG. 5 may be an illustration of the XSD Wrapper process 405 in further detail, in accordance with the claims. A report document may contain three types of rows; a header row, a data row, and a group row. At block 500 the wrapper gets the report document row and any corresponding objects contained therein. The wrapper first calculates, at block 505, if the row is of type header and, if so, converts the report document row to an XSD row at block 510. However, if the wrapper calculates that the report document row is not of type header, then block 515 calculates if the row is of type data. If the row is of type data, then block 520 converts the data row to an XSD row. Finally, if block 515 calculates that the report document row is of type group, then block 525 converts the group row to an XSD row. At the completion of any row conversion, block 530 sends the new XSD row to the XML serializer. The XSD Wrapper process 405 (as shown in FIG. 5) repeats as many times as necessary to accommodate all rows within a report document 400.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of exporting a report generated by an application to an alternate format, the method comprising the steps of:
   (a) generating at least one report including data from a database;
   (b) generating at least one report document from the at least one report, the at least one report document having a plurality of rows, at least one of the plurality of rows containing no report document objects therein, and at least one of the plurality of rows containing one or more report document objects therein;
   (c) establishing a row pointer to each one of the plurality of rows in an iterative fashion;
   (d) during the time that the row pointer is established with respect to each one of the plurality of rows, determining if the row pointed to by the row pointer does not include any report document objects contained therein and, if so, then immediately serializing that row to an extensible markup language document before the row pointer is established to another one of the plurality of rows; and
   (e) during the time that the row pointer is established with respect to each one of the plurality of rows, determining if a row pointed to by the row pointer includes one or more report document objects and, if so, then converting the one or more report document objects to a corresponding number of extensible markup language schema definition objects and then immediately serializing and de-allocating the extensible markup language schema definition objects to the extensible markup language document before the row pointer is established to another one of the plurality of rows.

2. The method of claim 1, wherein the report document contains at least one report document object type of at least one of values, names, and styles.

3. The method of claim 1, wherein step (e) further comprises determining if a row to which the pointer is established is at least one of type header, data, and group and executing the conversion based upon the determination.

4. The method of claim 3, wherein step (e) further comprises determining if the row is a header row and, if so, then converting the header row to an extensible markup schema definition row.

5. The method of claim 3, wherein step (e) further comprises determining if the row is a data row and, if so, then converting the data row to an extensible markup schema definition row.

6. The method of claim 3, wherein step (e) further comprises determining if the row is a group row and, if so, then converting the group row to an extensible markup schema definition row.

7. The method of claim 1, further comprising the step of creating the extensible markup language document for spreadsheet program.

8. A method of exporting a report generated by an application to an alternate format, the method comprising the steps of:
   (a) generating at least one report including data from a database;
   (b) generating at least one report document from the at least one report, the at least one report document having a plurality of rows, at least one of the plurality of rows containing no report document objects therein, and at least one of the plurality of rows containing one or more report document objects therein;
   (c) establishing a row pointer to each one of the plurality of rows in an iterative fashion:
   (d) during the time that the row pointer is established with respect to each one of the plurality of rows, determining if the row pointed to by the row pointer does not include any report document objects contained therein and, if so, then immediately serializing that row to an extensible markup language document before the row pointer is established to another one of the plurality of rows;
   (e) during the time that the row pointer is established with respect to each one of the plurality of rows, determining if a row pointed to by the row pointer includes one or more report document objects and, if so, then converting the one or more report document objects to a corresponding number of extensible markup language schema definition objects and then immediately serializing and de-allocating the extensible markup language schema definition objects to the extensible markup language document before the row pointer is established to another one of the plurality of rows;
   wherein step (e) further comprises determining if a row to which the pointer is established is at least one of type header, data, and group and executing the conversion based upon the determination;
   wherein step (e) further comprises determining if the row is a header row and, if so, then converting the header row to an extensible markup schema definition row;
   wherein step (e) further comprises determining if the row is a data row and, if so, then converting the data row to an extensible markup schema definition row;
   wherein step (e) further comprises determining if the row is a group row and then, if so, converting the group row to an extensible markup schema definition row;
   creating the extensible markup language document for spreadsheet program; and
   wherein the report document contains at least one report document object type of at least one of values, names, and styles.

* * * * *

UNITED STATES PATENT AND TRADEMARK OFFICE
CERTIFICATE OF CORRECTION

PATENT NO.       : 7,584,414 B2                                             Page 1 of 1
APPLICATION NO.  : 11/047919
DATED            : September 1, 2009
INVENTOR(S)      : Joern Lindhard Mortensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this

Fourteenth Day of September, 2010

David J. Kappos
*Director of the United States Patent and Trademark Office*